US012672201B2

(12) United States Patent
Zheng et al.

(10) Patent No.: US 12,672,201 B2
(45) Date of Patent: Jun. 30, 2026

(54) CONFIGURATION METHOD AND APPARATUS, AND DEVICE

(71) Applicant: VIVO MOBILE COMMUNICATION CO., LTD., Dongguan (CN)

(72) Inventors: Qian Zheng, Dongguan (CN); Jianming Wu, Dongguan (CN); Jiamin Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 283 days.

(21) Appl. No.: 18/378,142

(22) Filed: Oct. 9, 2023

(65) Prior Publication Data

US 2024/0049345 A1     Feb. 8, 2024

Related U.S. Application Data

(63) Continuation of application No. PCT/CN2022/085312, filed on Apr. 6, 2022.

(30) Foreign Application Priority Data

Apr. 9, 2021    (CN) .......................... 202110384492.9

(51) Int. Cl.
*H04W 76/28*          (2018.01)
*H04W 28/02*          (2009.01)

(52) U.S. Cl.
CPC ....... *H04W 76/28* (2018.02); *H04W 28/0268* (2013.01)

(58) Field of Classification Search
CPC . H04W 76/28; H04W 28/0268; H04W 76/14; H04W 28/02; Y02D 30/70
See application file for complete search history.

(56) References Cited

U.S. PATENT DOCUMENTS

2014/0286215 A1*   9/2014   Koc ...................... H04W 28/24
                                                                 370/311
2020/0092937 A1*   3/2020   Yang ................. H04W 28/0268
                              (Continued)

FOREIGN PATENT DOCUMENTS

CN         109314869 A      2/2019
CN         110115101 A      8/2019
                   (Continued)

OTHER PUBLICATIONS

3GPP TSG-RAN WG2 Meeting #113bis electronic R2-2102817—E-Meeting, Apr. 12-Apr. 20, 2021 (Year: 2021).*
                   (Continued)

*Primary Examiner* — Nizar N Sivji

(57) ABSTRACT

A configuration method, a terminal, and a non-transitory computer readable storage medium are provided. The method includes: configuring, by a terminal, a first Discontinuous Reception (DRX) parameter based on Quality of Service (QoS) Profile information, and configuring, by the terminal, a second DRX parameter based on Destination Layer 2 (L2) ID information. The QoS Profile information includes a plurality of QoS IDs. The terminal includes a plurality of Destination L2 IDs. The first DRX parameter includes at least a sidelink discontinuous reception on-Duration Timer (sl-drx-onDurationTimer) parameter or a sidelink discontinuous reception Cycle (sl-drx-Cycle) parameter. The second DRX parameter includes at least a sidelink discontinuous reception Start Offset (sl-drx-StartOffset) parameter.

20 Claims, 9 Drawing Sheets

A terminal configures a first DRX parameter based on QoS Profile information ⟋ 201

The terminal configures a second DRX parameter based on Destination L2 ID information ⟋ 202

(56) References Cited

U.S. PATENT DOCUMENTS

| | | | | |
|---|---|---|---|---|
| 2021/0105857 A1* | 4/2021 | He | ........................ | H04W 80/02 |
| 2021/0185762 A1* | 6/2021 | Li | ..................... | H04W 52/0216 |
| 2021/0360736 A1* | 11/2021 | Chen | .................... | H04W 80/02 |
| 2023/0034294 A1* | 2/2023 | Zhang | ............... | H04W 52/0216 |
| 2023/0066448 A1* | 3/2023 | Tseng | ................... | H04W 72/20 |
| 2023/0139122 A1* | 5/2023 | Park | ................. | H04W 28/0268 |
| | | | | 370/328 |
| 2023/0363049 A1* | 11/2023 | Luo | ........................ | H04W 76/14 |
| 2023/0422344 A1* | 12/2023 | Cai | ........................ | H04L 1/1896 |
| 2024/0357618 A1* | 10/2024 | Park | ................. | H04W 28/0268 |
| 2024/0365346 A1* | 10/2024 | Hong | .................... | H04L 1/1812 |

FOREIGN PATENT DOCUMENTS

| | | |
|---|---|---|
| CN | 111278171 A | 6/2020 |
| WO | 2021067814 A1 | 4/2021 |

OTHER PUBLICATIONS

International Search Report issued in corresponding International Application No. PCT/CN2022/085312, mailed Jun. 23, 2022, 4 pages.
Vivo, "SL DRX for broadcast and groupcast", 3GPP TSG-RAN WG2 Meeting #113bis electronic, E-Meeting, R2-2102817, Apr. 2021, 7 pages.

* cited by examiner

On duration

Non-on duration

DRX cycle

201

A terminal configures a first DRX parameter based on QoS Profile information

202

The terminal configures a second DRX parameter based on Destination L2 ID information

CONFIGURATION METHOD AND APPARATUS, AND DEVICE

CROSS-REFERENCE TO RELATED APPLICATIONS

This application is a continuation of International Application No. PCT/CN2022/085312, filed on Apr. 6, 2022, which claims priority to Chinese Patent Application No. 202110384492.9 filed on Apr. 9, 2021. The entire contents of each of the above-referenced applications are expressly incorporated herein by reference.

TECHNICAL FIELD

This application relates to the field of communication technologies, and specifically, to a configuration method and apparatus, and a device.

BACKGROUND

For a Receive User Equipment (Rx UE), in a case that a Discontinuous Reception Timer (DRX Timer) is configured through Quality of Service (QoS) information, in order to ensure that the Rx UE can receive a corresponding data packet, a Transmit User Equipment (Tx UE) needs to adjust a transmit time, and transmit the data packet within an activate time of the Rx UE. Since the time of the Rx UE on duration is limited, the possibility of a transmission resource conflict selected by the Tx UE is greatly increased, resulting in a decrease in Packet Reception Ratio (PRR) performance.

SUMMARY

Embodiments of this application provide a configuration method and apparatus, and a device.

According to a first aspect, a configuration method is provided, including:

configuring, by a terminal, a first DRX parameter based on QoS Profile information; and configuring, by the terminal, a second DRX parameter based on Destination L2 ID information:

where the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an sl-drx-StartOffset parameter.

According to a second aspect, a configuration apparatus is provided, including:

a first configuration module, configured to configure, by a terminal, a first DRX parameter based on QoS Profile information; and a second configuration module, configured to configure, by the terminal, a second DRX parameter based on Destination L2 ID information, where the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an sl-drx-StartOffset parameter.

According to a third aspect, a terminal is provided, including a processor, a memory, and a program or instruction stored in the memory and executable on the processor, where the program or instruction, when executed by the processor, implements steps of the method according to the first aspect.

According to a fourth aspect, a terminal is provided, including a processor and a communication interface, where the processor is configured to configure, by a terminal, a first discontinuous reception DRX parameter based on QoS Profile information; and configure, by the terminal, a second DRX parameter based on Destination L2 ID information, where the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an sl-drx-StartOffset parameter.

According to a fifth aspect, a readable storage medium is provided, where the readable storage medium stores a program or instruction, and the program or instruction, when executed by a processor, implements steps of the configuration method according to the first aspect.

According to a sixth aspect, a chip is provided, including a processor and a communication interface, where the communication interface is coupled to the processor, and the processor is configured to run a program or instruction, to implement the method according to the first aspect.

According to a seventh aspect, a computer program product is provided, where the computer program product is stored in a non-volatile storage medium, and is executed by at least one processor to implement the method according to the first aspect.

In the embodiments of this application, for DRX parameter configuration, the sl-drx-onDurationTimer parameter and the sl-drx-Cycle parameter are firstly configured based on the QoS Profile information, thereby increasing the granularity of the DRX parameter configuration and improving the power-saving effect. Then, the sl-drx-StartOffset parameter is configured based on the Destination L2 ID information, thereby greatly reducing the channel resource conflict rate without affecting the overall power-saving effect of the system.

DETAILED DESCRIPTION

Figures 1, 2:
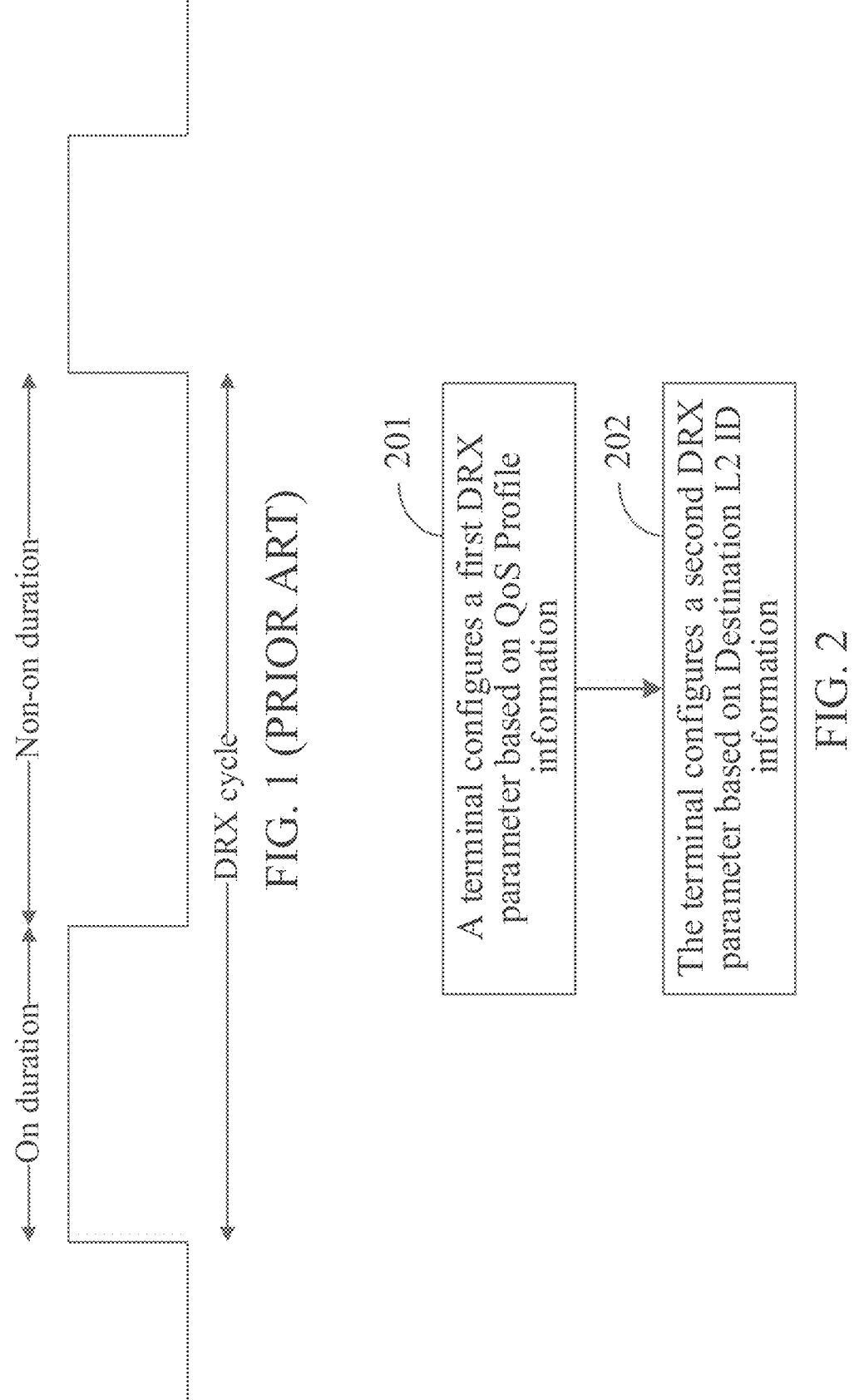
FIG. 1 is a schematic diagram of a relationship between DRX parameters.
FIG. 2 is a schematic flowchart of a configuration method according to an embodiment of this application.

The following clearly describes the technical solutions in the embodiments of this application with reference to the accompanying drawings in the embodiments of this application. Apparently, the described embodiments are some of the embodiments of this application rather than all of the embodiments. All other embodiments obtained by a person of ordinary skill in the art based on the embodiments of this application fall within the protection scope of this application.

The specification and claims of this application, and terms "first" and "second" are used to distinguish similar objects, but are unnecessarily used to describe a specific sequence or order. It should be understood that the terms used in this way are interchangeable in proper circumstances, so that the embodiments of this application can be implemented in other orders than the order illustrated or described herein. Objects distinguished by "first", "second", and the like are usually one type, and the number of objects is not limited. For example, there may be one or more first objects. In addition, in the specification and the claims, "and/or" means at least one of the connected objects, and the character "/" generally indicates an "or" relationship between the associated objects.

It should be noted that, the technologies described in the embodiments of this application are not limited to a Long Term Evolution (LTE) system or an LTE-Advanced (LTE-A) system, and can also be used in other wireless communication systems, such as, Code Division Multiple Access (CDMA), Time Division Multiple Access (TDMA), Frequency Division Multiple Access (FDMA), Orthogonal Frequency Division Multiple Access (OFDMA), Single-Carrier Frequency-Division Multiple Access (SC-FDMA), and other systems. The terms "system" and "network" in the embodiments of this application are often used interchangeably, and the described technology can be used not only for the above systems and radio technologies, but also for other systems and radio technologies. The following description describes a New Radio (NR) system for example objectives, and NR terms are used in most of the description below, but these technologies are also applicable to applications other than NR system applications, such as a $6^{th}$ Generation (6G) communication system.

To better understand the solutions in the embodiments of this application, the following content is firstly introduced:

Sidelink (SL) DRX parameter and configuration

Parameters related to DRX mainly include a sidelink discontinuous reception on duration timer (sl-drx-onDurationTimer), a sidelink discontinuous reception cycle (sl-drx-Cycle), and a sidelink discontinuous reception start offset (sl-drx-StartOffset). The parameters have different uses. The sl-drx-onDurationTimer is an on duration at the beginning of a DRX cycle, and its amplitude depends on how many Tx UEs need to transmit a data packet. In other words, it depends on a Congestion Rate (CR) value. drx-Cycle is a DRX cycle, which depends on the smallest Packet Delay Budget (PDB) in a QoS profile group. The si-drx-StartOffset determines a start time of sl-onDuration. The start time may be calculated according to the following formula.

$$[(SFN \times 10) + \text{subframe number}]\text{modulo}(sl\text{-}drx\text{-}\text{Cycle}) = sl\text{-}drx\text{-}\text{StartOffset};$$

FIG. 1 shows a relationship between DRX parameters.

DRX configuration method based on QoS Profile

For each data service, an upper layer provides QoS information related to an Access Statum (AS) layer and the data service. The QoS information has a priority level(that is, ProSe Per-Packet Priority (PPPP)), a Packet Error Rate (PER) (that is, ProSe Per-Packet Reliability (PPPR)), a Packet Delay Budget (PDB), a communication range, and the like. DRX related parameters may be configured through the QoS information. For example, based on the tolerance of the PDB, different lengths of the drx-Cycle may be configured, that is, if the tolerance of the PDB is large, the amplitude of the drx-Cycle may be configured to be longer, and vice versa. Since the QoS has a high granularity, the granularity of the DRX parameters configured for an Rx UE may be correspondingly increased.

DRX configuration method based on Destination Layer 2 (L2) ID

A Tx UE performs unicast, groupcast, and broadcast transmission on SL-related data packets through corresponding Destination L2 IDs. After receiving the data packets, the Rx UE determines whether to further decode the data packets based on the Destination L2 ID related to itself to obtain the needed information. For the Rx UE, the Destination L2 ID information is simple, and it is simple to use the Destination L2 ID to configure the DRX parameters.

For the Rx UE, although using the QoS information to configure a DRX Timer has high granularity, the DRX Timer configurations related to the same QoS are the same. In other words, the Rx UEs with the same QoS are activated at the same time to receive the data packets. In order to ensure that the Rx UE can receive the corresponding data packet, the Tx UE needs to adjust a transmit time, and transmit the data packet within an active time of the Rx UE. Since the time of the Rx UE onDuration is limited, the possibility of a transmission resource conflict selected by the Tx UE is greatly increased, resulting in a decrease in PRR performance.

In addition, in the groupcast or broadcast transmission, the UE generally has a plurality of upper-layer applications and/or services, but uses the same Destination L2 ID at the AS layer. Due to the granularity of DRX configuration, the Rx UE can only configure the DRX parameters based on the QoS of the shortest PDB in the groupcast or broadcast transmission, which greatly reduces the power-saving effect of the Rx UE.

In summary, using the QoS information to configure all DRX parameters, or using the Destination L2 ID to configure all DRX parameters has its own advantages and disadvantages.

Referring to FIG. 2, an embodiment of this application provides a configuration method, including.

Step 201: A terminal configures a first DRX parameter based on QoS Profile information.

Step 202: The terminal configures a second DRX parameter based on Destination L2 ID information.

In this embodiment of this application, the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an sl-drx-StartOffset parameter.

In the embodiments of this application, for DRX parameter configuration, the sl-drx-onDurationTimer parameter and the sl-drx-Cycle parameter are firstly configured based on the QoS Profile information, thereby increasing the granularity of the DRX parameter configuration and improving the power-saving effect. Then, the sl-drx-StartOffset parameter is configured based on the Destination L2 ID information, thereby greatly reducing the channel resource conflict rate without affecting the overall power-saving effect of the system.

That is, in this embodiment of this application, the DRX configuration method based on a QoS Profile is combined with the DRX configuration method based on the Destination L2 ID, that is, the QoS information is used to configure some DRX parameters, and the Destination L2 ID is used to configure the other DRX parameters. Therefore, the effect of greatly reducing conflicts in selecting resources is implemented without affecting the overall power-saving performance of the system.

It should be noted that the terminal refers to an Rx UE, and correspondingly, a peer terminal of the terminal is a Tx UE.

In some implementations, that the terminal configures a first DRX parameter based on QoS Profile information includes.

(1) The terminal groups the plurality of QoS IDs based on a PDB corresponding to each QoS ID, to obtain a plurality of QoS ID subgroups.

(2) The terminal configures a different first DRX parameter for each QoS ID subgroup based on a minimum value of PDB corresponding to each QoS ID subgroup, The QoS implementation of a data packet is mainly reflected in whether the reliability (that is, PER and PDB) of data packet transmission can be ensured. These are mainly implemented by configuring the amplitude of the corresponding onDurationTimer and drx-Cycle Therefore, in this embodiment of this application, the QoS Profile information is used to configure some parameters in DRX, that is, sl-drx-onDurationTimer and sl-drx-Cycle.

Because in the existing protocol, there are 17 types of standardized Pavement Quality Indicator (PQI) values (standardized PQI values and PC5 QoS IDs are in one-to-one correspondence), it may be up to 256 types with non-standardized PQI values (non-Standardized PQI) (non-standard PQI is flexibly defined through a set of PC5 QoS parameters, and non-standardized PQI values and PC5 QoS IDs are also in one-to-one correspondence). Therefore, the DRX parameters cannot be configured per PQI. Therefore, in this embodiment of this application, a grouping method is adopted to flexibly configure the DRX parameters for the sl-drx-onDurationTimer and sl-drx-Cycle parameters.

In this embodiment of this application, the terminal groups the QoS IDs based on the tolerance of the PDB. For example, the QoS ID subgroups are arranged according to the amplitude of the PDB The QoS ID subgroup may be configured and pre-configured through an upper layer, or flexibly configured through a network. QoS with a small PDB is arranged in the front, and QoS with a large PDB is arranged in the back, that is, PDB for QoS-n≤PDB for QoS-(n+1). For a grouping method, reference may be to a scenario in FIG. 3 as an example.

In addition, grouping is also performed through an implicit indication method. For example, grouping is performed by a Priority (a total of 8 Levels) indicated by System Control Information (SCI) It should be noted that each resource pool is configured with a different Priority and a List of sidelink selection windows (sl-SelectionWindows) The Priority implies information required for reliability of the QoS of the data packet, and the sl-SelectionWindow implies information required for the PDB of the QoS of the data packet. The Priority indicated by the SCI can implement one-to-one mapping. Therefore, when an Rx UE receives the first data packet of a new service, the SCI in the data packet may imply QoS information required for transmission. Through this implicit method, the Rx UE performs flexible DRX configuration for the currently required QoS, and there is no mismatching between the Tx UE and the Rx UE(s).

Figure 3:
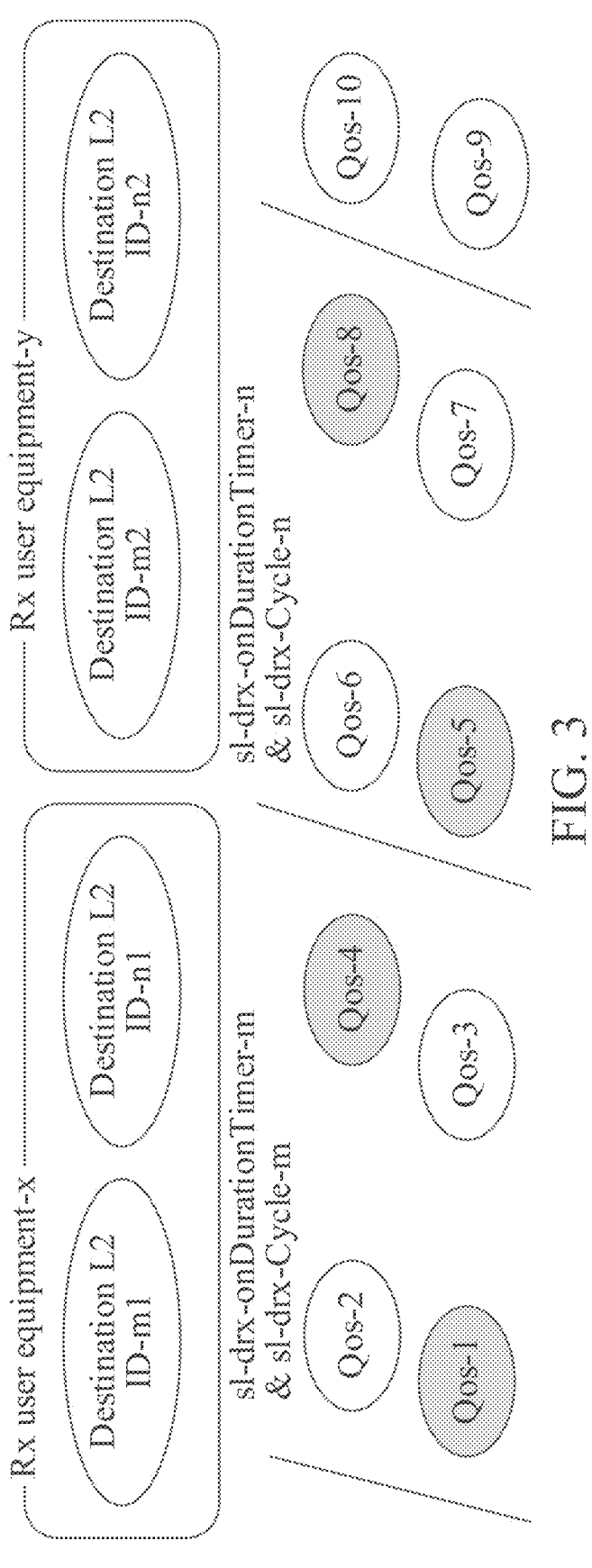
FIG. 3 is a first schematic diagram of an application scenario according to an embodiment of this application.

Since each Destination L2 ID is mapped to one or more QoS IDs, at least one set of DRX parameters are configured for each Destination L2 ID The DRX parameters are determined based on the QoS Profile with the smallest PDB in the Destination L2 ID. If the Rx UE is interested in the services of M Destination L2 IDs, and each Destination L2 ID is mapped to one or more QoS IDs, the Rx UE is configured with at least M sets of DRX parameters. As shown in FIG. 3, when the Rx UE determines the sl-drx-onDurationTimer and sl-drx-Cycle parameters, if the QoS Profile with the PDB in a Destination L2 ID-m1 is between QoS-1 and QoS-4, the Rx UE configures DRX parameters sl-drx-onDurationTimer-m and sl-drx-Cycle-m for the Destination L2 ID-m1. If the QoS Profile with the PDB in a Destination L2 ID-n1 is between QoS-5 and QoS-8, the Rx UE configures a second set of DRX parameters sl-drx-onDuration-Timer-n and sl-drx-Cycle-n for the Destination L2 ID-n1, and other cases may be deduced by analogy.

It should be noted that since the Tx uE and the Rx UE know the QoS ID required for the corresponding service in advance, the Tx UE and the Rx UE naturally know the related DRX parameters based on the configuration of the QoS ID subgroup and DRX parameters, that is, the specific sl-drx-onDurationTimer and sl-drx-Cycle parameter values of the Rx UE related implementation.

Further, in order to configure the DRX parameters more effectively, some restrictions may be added to the sl-drx-Cycle between QoS groups. In some implementations, the sl-drx-Cycle parameters in different QoS ID subgroups have an integer multiple relationship. The relationship between drx-Cycles herein may be a relationship between values of the drx-Cycle parameters, or a relationship between lengths of the drx-Cycle parameters, that is, the relationship between different drx-Cycle lengths may be N integer multiples, that is, sl-drx-Cycle-m=N×sl-drx-Cycle-n.

In some implementations, that the terminal configures a second DRX parameter based on Destination L2 ID information includes (1) The terminal groups a plurality of Destination L2 IDs to obtain a plurality of Destination L2 ID sets.

(2) The terminal configures a different second DRX parameter for each Destination L2 ID set.

In this embodiment of this application, after the Rx UE configures the sl-drx-onDurationTimer and sl-drx-Cycle parameters for each Destination L2 ID, the Rx UE configures the si-drx-StartOffset parameter in the DRX parameters for each Destination L2 ID.

Similarly, the number of the Destination L2 IDs may be large, and therefore, the Destination L2 IDs need to be grouped. The grouping of the Destination L2 IDs may be configured or pre-configured through an upper layer, or flexibly configured through a network. For example, the Destination L2 IDs may be assigned to different Destination L2 ID sets, and then each Destination L2 ID set may be configured with a corresponding sl-drx-StartOffset parameter. If the Destination L2 ID is the same as a member in a Destination L2 ID set, the Rx UE applies the sl-drx-StartOffset parameter related to this Destination L2 ID set.

It should be noted that since the Tx UE and the Rx UE know the Destination L2 ID used by the corresponding service in advance, the Tx UE and the Rx UE naturally know the related DRX Timer parameters based on the Destination L2 ID set and the configuration of the DRX parameters, that is, a specific sl-drx-StartOffset parameter value implemented by the Rx UE.

In some implementations, the first DRX parameters corresponding to different QoS ID subgroups are different, and the second DRX parameters corresponding to different QoS ID subgroups are the same. In this way, an overall active time of the terminal does not increase, but the channel resource conflict rate drops significantly.

In some implementations, the method further includes: The terminal determines an active duration and an inactive duration of the first DRX parameter and the second DRX parameter based on a Direct Frame Number (DFN).

In this embodiment of this application, the DFN is used to derive the active duration and inactive duration of DRX parameter configuration, to ensure that the Tx UE and the Rx UE are synchronized, that is, the Tx UE and the Rx UE have consistent understanding of a DRX pattern.

Further, the DFN may be any one of the following:

(1) A DFN of the terminal, that is, the DFN may be a DFN on an Rx UE side;

(2) A DFN of a peer terminal of the terminal, that is, the DFN may be a DFN on a Tx UE side;

(3) A DFN determined based on a PC5 RRC interaction process, that is, the DFN may be notified through the PC5 RRC interaction process or negotiated to use the DFN of one of the UEs.

The solutions of this application are described below with reference to some embodiments. For details, refer to FIG. 4a to FIG. 4e.

Embodiment 1

Figure 4A:
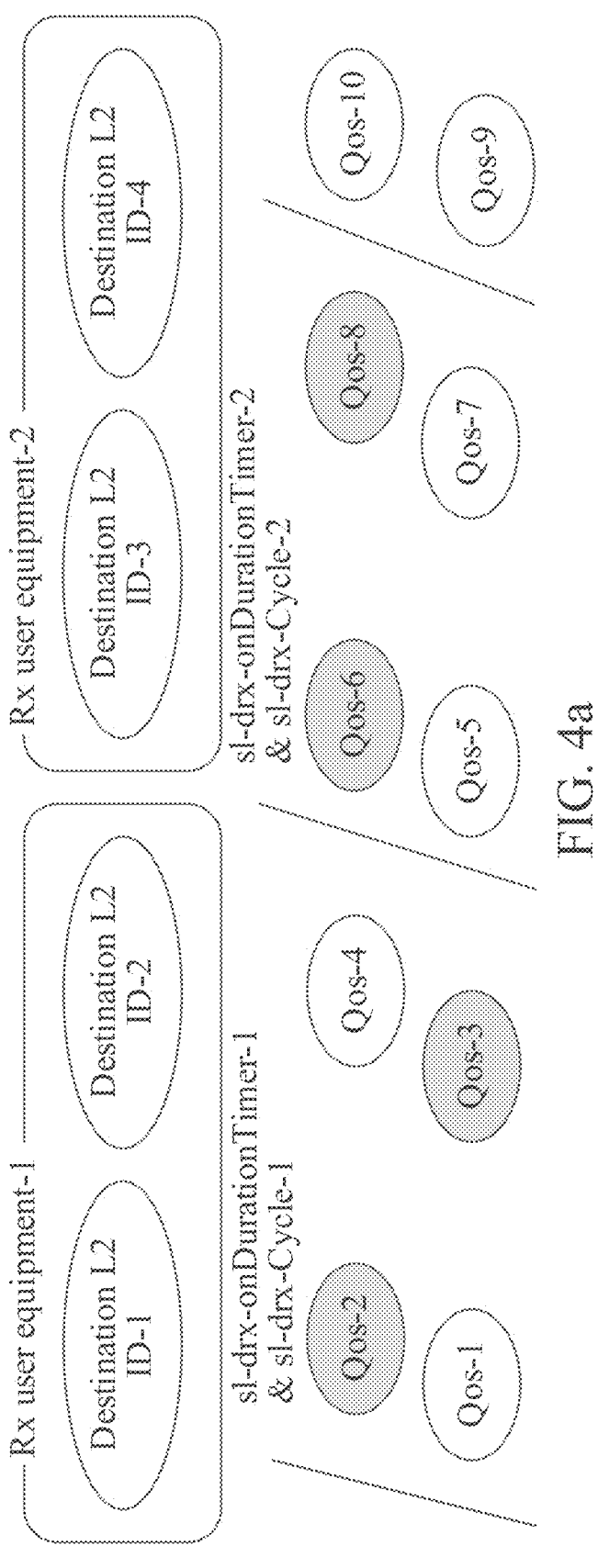
FIG. 4a is a second schematic diagram of an application scenario according to an embodiment of this application.

Referring to FIG. 4a, in this embodiment: an Rx UE-1 has a Destination L2 ID-1 and a Destination L2 ID-2, and an Rx UE-2 has a Destination L2 ID-3 and a Destination L2 ID-4. The Destination L2 IDs in which the Rx UE-1 and Rx UE-2 are interested are different. Therefore, the Rx UE-1 does not need to monitor the Destination L2 ID of the Rx UE-2, and the Rx UE-2 does not need to monitor the Destination L2 ID of the Rx UE-1. In addition, transmission of the Destination L2 ID-1 needs to meet a requirement of QoS-2, transmission of the Destination L2 ID-2 needs to meet a requirement of QoS-3, transmission of the Destination L2 ID-3 needs to meet a requirement of QoS-5, and transmission of the Destination L2 ID-4 needs to meet a requirement of QoS-8.

According to the foregoing scenarios, the Rx UE-1 configures sl-drx-onDurationTimer and sl-drx-Cycle parameters related to QoS-1 and QoS-5 for the Destination L2 ID-1 and the Destination L2 ID-2 respectively. The Rx UE-2 also configures the sl-drx-onDurationTimer and sl-drx-Cycle parameters related to the QoS-1 and the QoS-5 for the Destination L2 ID-3 and the Destination L2 ID-4 respectively.

Embodiment 2

Figure 4B:
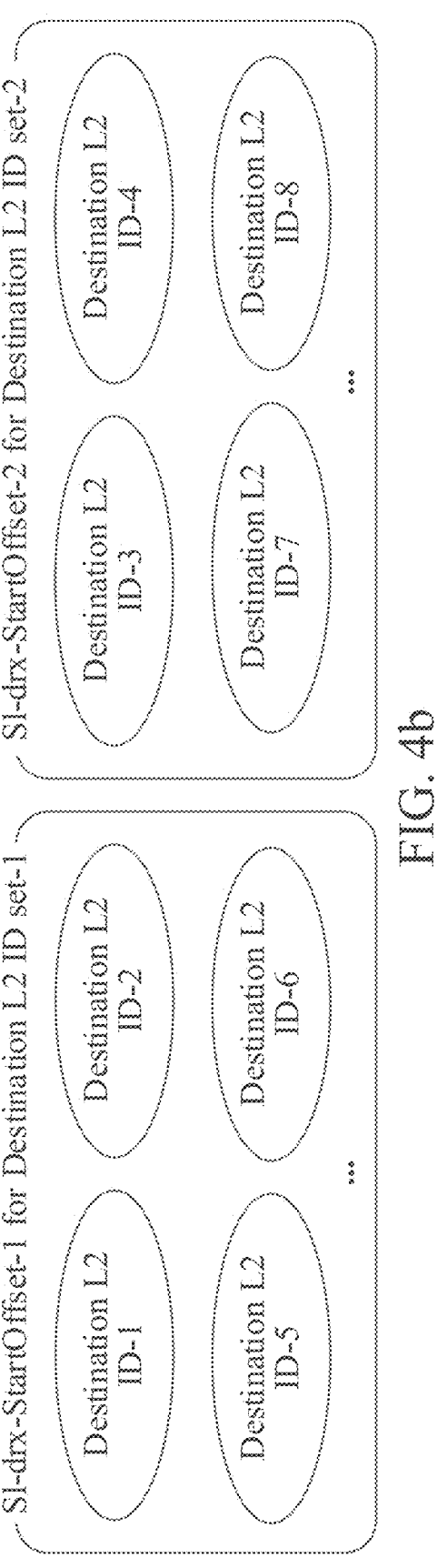
FIG. 4b is a third schematic diagram of an application scenario according to an embodiment of this application.

Referring to FIG. 4b, in this embodiment: an SL system performs set grouping of Destination L2 IDs based on the assigned Destination L2 IDs. The set grouping may be configured and pre-configured through an upper layer, or flexibly configured through a network. The SL system is configured with two Destination L2 ID sets, that is, a Destination L2 ID Set-1 and a Destination L2 ID Set-2. Different sl-drx-StartOffsets, that is, an Offset-1 and an Offset-2, are respectively configured for each set.

Since the Destination L2 IDs of the Rx UE-1 are all in the Destination L2 ID Set-1, the Rx UE-1 configures the same Offset-1 for the Destination L2 ID-1 and the Destination L2 ID-2. Since the Destination L2 IDs of the Rx UE-2 are all in the Destination L2 ID Set-2, the Rx UE-2 configures the same Offset-2 for the Destination L2 ID-3 and the Destination L2 ID-4. That is, the Rx UE-1 and the Rx UE-2 implement different Offset parameters.

Embodiment 3

The scenarios of this embodiment directly adopt the scenarios of Embodiment 1 and Embodiment 2 above, and are not repeated. In addition, this embodiment is a comparison in power saving between the method of configuring DRX parameters only based on the QoS Profile and the method of flexibly applying the QoS Profile and the Destination L2 ID to configure the DRX parameters.

Figure 4C:
FIG. 4c is a fourth schematic diagram of an application scenario according to an embodiment of this application.

Referring to FIG. 4c, if the Rx UE only configures the DRX parameters based on the QoS Profile, an active time of the Rx UE-1 and an active time of the Rx UE-2 are exactly the same. That is, when the Tx UE transmits a data packet, the Tx UE needs to transmit the data packet to the Rx UE-1 and the Rx UE-2 within the same active time. Therefore, selectable channel resources are limited, and the natural channel resource conflict rate increases.

Figure 4D:
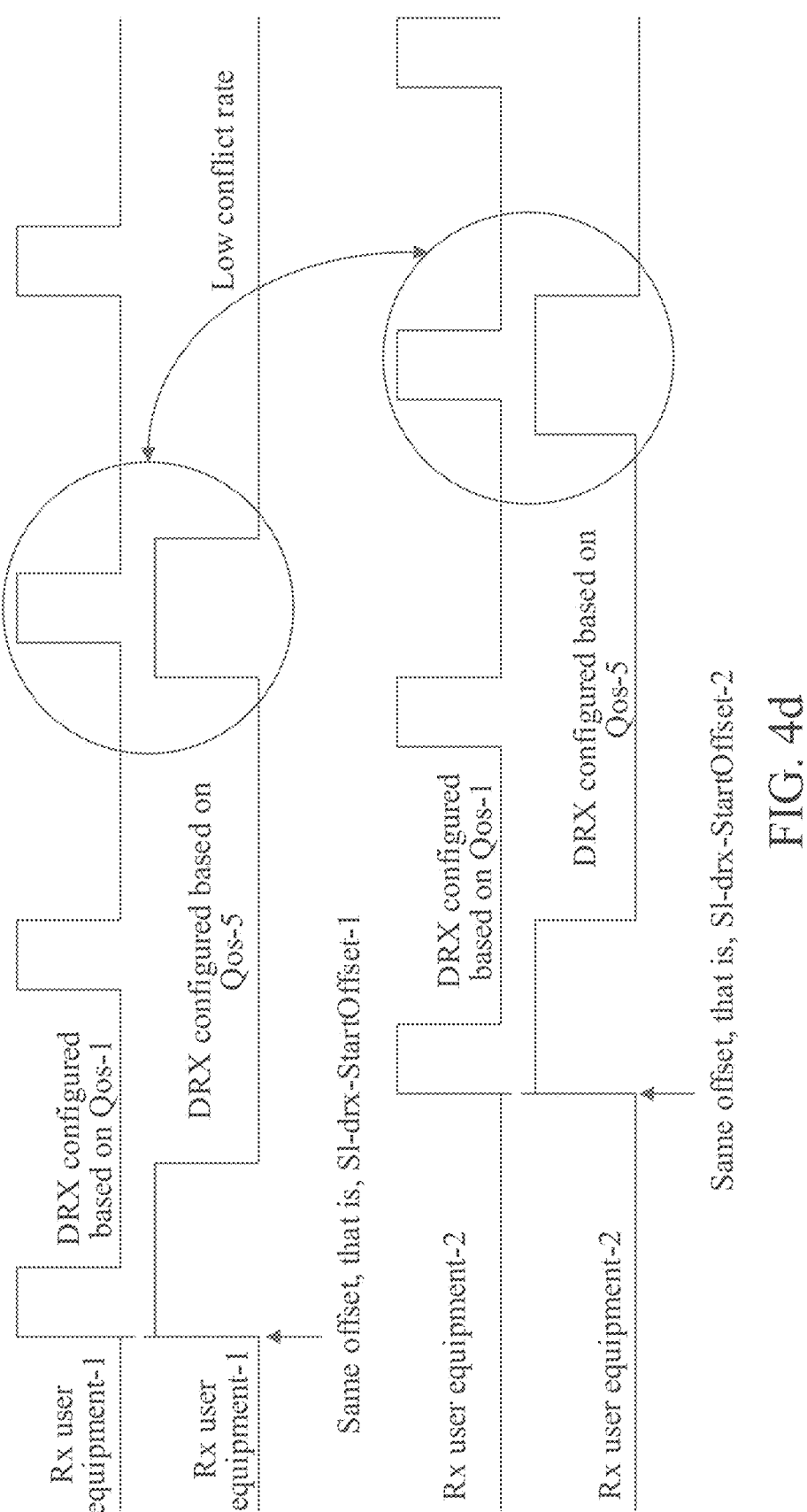
FIG. 4d is a fifth schematic diagram of an application scenario according to an embodiment of this application.

Referring to FIG. 4d, if the Rx UE configures the DRX parameters based on the flexible application of the QoS Profile and the Destination L2 ID, the Rx UE uses different sl-drx-onDurationTimer and si-drx-Cycle parameters, but uses the same sl-drx-StartOffset parameter. It can be seen that compared with the method of configuring the DRX parameters only based on the QoS Profile, the overall active time of the Rx UE-1 and the Rx UE-2 does not increase, but the channel resource conflict rate drops significantly.

Embodiment 4

The scenarios of this embodiment directly adopt the scenarios of Embodiment 1 and Embodiment 2 above, and are not repeated. In order to configure the DRX parameters more effectively, some related restrictions may be added to the sl-drx-Cycle between QoS groups. For example, a relationship between different drx-Cycles may be an integer multiple of N, that is, sl-drx-Cycle-m=N×sl-drx-cycle-n. The relationship between drx-Cycles herein may be a relationship between values of the drx-Cycle parameters, or a relationship between lengths of the drx-Cycle parameters.

In this embodiment, the relationship between a QoS group 1 and a QoS group 2 is sl-drx-Cycle-2:=2-sl-drx-Cycle-1.

Figure 4E:
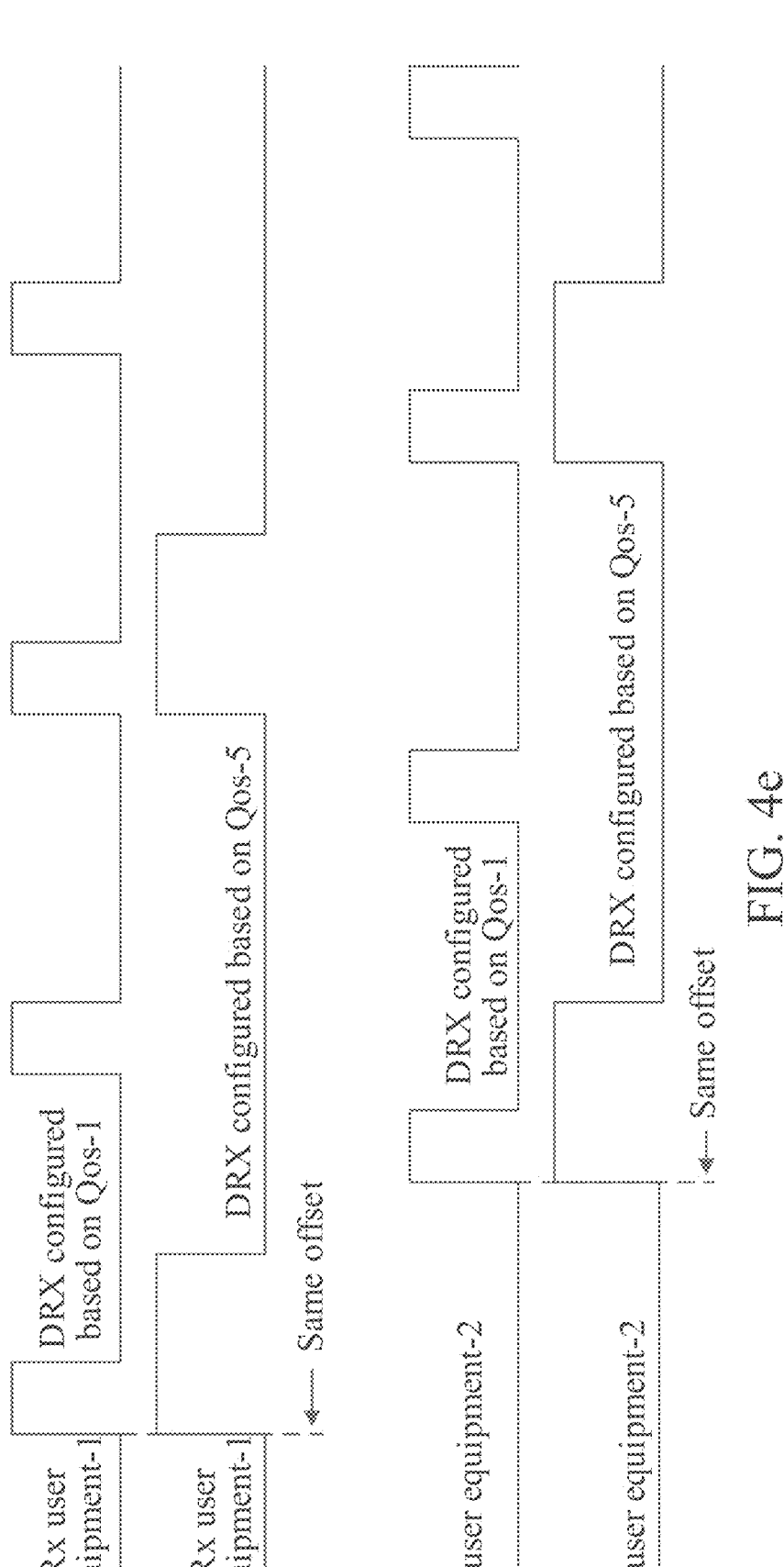
FIG. 4e is a sixth schematic diagram of an application scenario according to an embodiment of this application.

Referring to FIG. 4e, based on the DRX parameter configuration of the QoS Profile and the Destination L2 ID, if the DRX cycle based on QoS-5 is twice that of the DRX cycle based on QoS-1, the power-saving efficiency can be further improved. It can be seen that the Rx UE can shorten the overall active time by using an activation method for a partially overlapping onDuration, and improve the power-saving efficiency without affecting the overall system performance.

Embodiment 5

(1) Method for synchronizing groupcast and broadcast DRX patterns between the Tx UE and the Rx UE:

In an LTE air interface (Uu interface), since a UE and a gNB are strictly synchronized, a System Frame Number (SFN) and a subframe are understood exactly the same Therefore, the calculation of the DRX pattern is determined based on deviations of the SFN and the subframe, and the active time is understood consistently between the UE and the gNB.

In an SL operation, since the Tx UE and the Rx UE may be located in the same cell or different cells, online or offline, the Tx UE and the Rx UE may fail to obtain the synchronized SFN and subframe. In this case, using the SFN to calculate the active time in the SL DRX pattern is no longer suitable, and an alternative is to use the DFN and the subframe to calculate the SL DRX pattern, for example:

(a) For SL DRX, [(DFN×10)+subframe number] modulo (sl-drx-Cycle)=sl-drx-StartOffset (b) Start drx-onDurationTimer for this SL DRX group after sl-drx-SlotOffset from the beginning of the subframe (start drx-onDurationTimer for this SL DRX group after sl-drx-SlotOffset from the beginning of the subframe).

In some alternative embodiments, in the foregoing formula, a slot offset may be removed, starting from an initial position of the subframe.

If the DFN is on a Tx UE side. When the Rx UE prepares to receive broadcast broadcast and groupcast groupcast services, the active time is calculated based on the DRX configuration parameters and the DFN on the Tx UE side, and SCI monitoring is performed within the active time. The DFN synchronization of a plurality of Tx UEs is ensured by the configuration and implementation of a network side. When a Tx UE DFN is out of synchronization, the Rx UE implements to decide how to monitor, such as selecting a DFN to calculate the DRX active time, or waking up for SC monitoring within the DRX active time calculated by all DFNs.

When a UE is offline, it first obtains the synchronized DFN from the surrounding UEs, and then performs transmitting and receiving correspondingly based on the active time calculated by the DFN and DRX parameters. When a UE cannot obtain a DFN synchronized with surrounding UEs at all, there is no provision for transmitting and monitoring of the UE, that is, it can perform continuous monitoring or transmitting at any resource location.

(2) Method for synchronizing Unicast DRX patterns:

In a case of SL unicast unicast, if the Tx UE transmits SL DRX parameters to the Rx UE for the definition of the DRX pattern in the direction of Tx UE->Rx UE, the DRX parameters are calculated based on the DFN of the Tx UE by default to obtain the active time. If the Rx UE transmits SI. DRX parameters or auxiliary information to the Tx UE for the definition of the DRX pattern in the direction of Tx UE->Rx UE, it is still stipulated that the DRX parameters are calculated based on the DFN of the Tx UE by default to obtain the active time.

If the two directions of the SI unicast are two UEs of the Tx UE and their DFNs are not synchronized, DRX calculation may be performed based on the DFNs of the Tx UE in their own directions, or the DFN of one of the UEs is used for calculation. This UE is notified or negotiated by a PC5 RRC interaction process.

It should be noted that, in the configuration method provided in the embodiments of this application, an execution body may be a configuration apparatus, or a control module in the configuration apparatus that is configured to perform the configuration method. In the embodiments of this application, an example in which a configuration apparatus performs the configuration method is used to describe the configuration apparatus in the embodiments of this application.

Figures 5, 6:
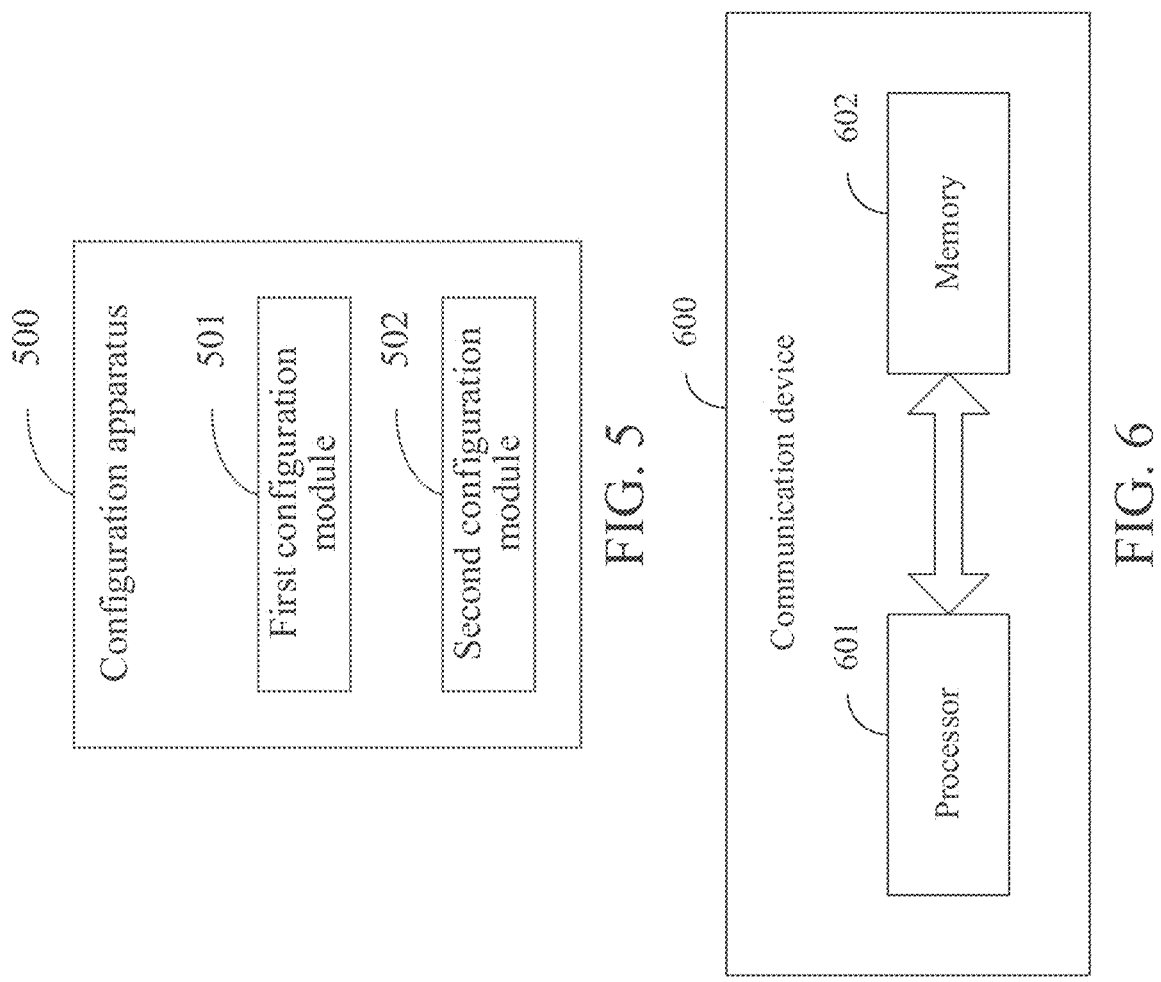
FIG. 5 is a schematic structural diagram of a configuration apparatus according to an embodiment of this application.
FIG. 6 is a schematic structural diagram of a communication apparatus according to an embodiment of this application.

Referring to FIG. 5, a configuration apparatus 500 according to an embodiment of this application includes:

a first configuration module 501, configured to configure, by a terminal, a first DRX parameter based on QoS Profile information; and a second configuration module 502, configured to configure, by the terminal, a second DRX parameter based on Destination L2 ID information, where the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an sl-drx-StartOffset parameter.

In some implementations. the first configuration module includes:

a first grouping unit, configured to group, by the terminal, the plurality of QoS IDs based on a PDB corresponding to each QoS ID, to obtain a plurality of QoS ID subgroups; and a first configuration unit, configured to configure, by the terminal, a different first DRX parameter for each the QoS ID subgroup based on a minimum value of the PDB corresponding to each QoS ID subgroup, where each Destination L2 ID corresponds to at least one QoS ID subgroup.

In some implementations, the second configuration module includes:

a second grouping unit, configured to group, by the terminal, the plurality of Destination L2 IDs to obtain a plurality of Destination L2 ID sets; and a second configuration unit, configured to configure, by the terminal, a different second DRX parameter for each Destination L2 ID set.

In some implementations, the sl-drx-Cycle parameters in different QoS ID subgroups have an integer multiple relationship.

The relationship between drx-Cycles herein may be a relationship between values of the drx-Cycle parameters, or a relationship between lengths of the drx-Cycle parameters.

In some implementations, the apparatus further includes:

a determining module, configured to determine, by the terminal, an active duration and an inactive duration of the first DRX parameter and the second DRX parameter based on a direct frame number DFN In some implementations, the DFN is any of the following:

a DFN of the terminal, a DFN of a peer terminal of the terminal; and a DFN determined based on a PC5 RRC interaction process.

In some implementations, the first DRX parameters corresponding to different QoS ID subgroups are different, and the second DRX parameters corresponding to different QoS ID subgroups are the same.

In the embodiments of this application, for DRX parameter configuration, the sl-drx-onDurationTimer parameter and the sl-drx-Cycle parameter are firstly configured based on the QoS Profile information, thereby increasing the granularity of the DRX parameter configuration and improving the power-saving effect. Then, the sl-drx-StartOffset parameter is configured based on the Destination L2 ID information, thereby greatly reducing the channel resource conflict rate without affecting the overall power-saving effect of the system.

The configuration apparatus in the embodiments of this application may be an apparatus, or may be an apparatus with an operating system or an electronic device, or a component, an integrated circuit, or a chip in a terminal. The apparatus or the electronic device may be a mobile terminal or may be a non-mobile terminal. For example, the mobile terminal may include, but is not limited to, the types of the terminal 11 listed above, and the non-mobile terminal may be a server, a Network Attached Storage (NAS), a Personal Computer (PC), a Television (TV), a teller machine, or a self-service machine, which are not specifically limited in the embodiments of this application.

The configuration apparatus provided in the embodiments of this application can implement all processes implemented by the method embodiment of FIG. 2 and achieve the same technical effects. To avoid repetition, details are not repeated herein again.

For example, as shown in FIG. 6, an embodiment of this application further provides a communication device 600, including a processor 601, a memory 602, and a program or instruction stored in the memory 602 and executable on the processor 601. For example, in a case that the communication device 600 is a terminal, the program or instruction, when executed by the processor 601, implements all processes of the foregoing configuration method embodiment, and can achieve the same technical effects. In a case that the communication device 600 is a network-side device, the program or instruction, when executed by the processor 601, implements all processes of the foregoing configuration method embodiment, and can achieve the same technical effects. To avoid repetition, details are not repeated herein again.

An embodiment of this application further provides a terminal, including a processor and a communication interface, where the processor is configured to configure, by a terminal, a first discontinuous reception DRX parameter based on quality of service profile QoS Profile information; and configure, by the terminal, a second DRX parameter based on Destination L2 ID information, where the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an si-drx-StartOffset parameter. The terminal embodiment corresponds to the foregoing terminal method embodiment, and the implementation processes and implementations of the foregoing method embodiment can be applied to the terminal embodiment, and can achieve the same technical effects.

Figure 7:
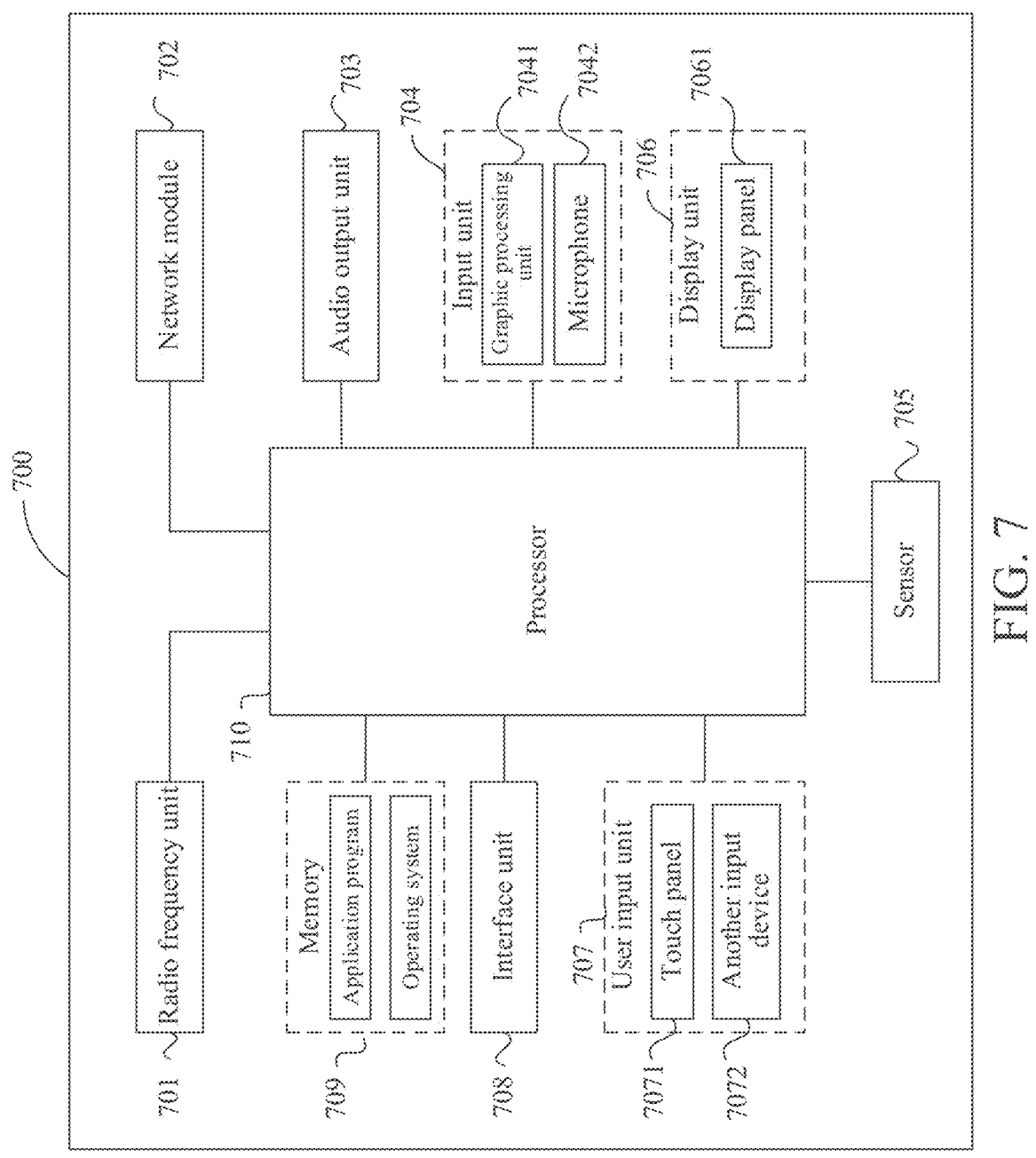
FIG. 7 is a schematic structural diagram of a terminal according to an embodiment of this application.

For example, FIG. 7 is a schematic diagram of a hardware structure of a terminal that implements the embodiments of this application.

The terminal 700 includes, but is not limited to: at least some components in a radio frequency unit 701, a network module 702, an audio output unit 703, an input unit 704, a sensor 705, a display unit 706, a user input unit 707, an interface unit 708, a memory 709, and a processor 710.

A person skilled in the art may understand that the terminal 700 further includes a power supply (such as a battery) for supplying power to the components. The power supply may logically connect to the processor 710 by using a power supply management system, thereby implementing functions, such as charging, discharging, and power consumption management, by using the power supply management system. A terminal structure shown in FIG. 7 does not constitute a limitation to the terminal, and the terminal may include more or fewer components than those shown in the figure, or some components may be combined, or a different component deployment may be used. Details are not described herein again.

It should be understood that, in this embodiment of this application, the input unit 704 may include a Graphics Processing Unit (GPU) 7041 and a microphone 7042. The graphics processing unit 7041 performs processing on image data of a static picture or a video that is obtained by an image acquisition apparatus (for example, a camera) in a video acquisition mode or an image acquisition mode. The display unit 706 may include a display panel 7061, for example, the display panel 7061 may be configured in a form such as a liquid crystal display or an organic light-emitting diode. The user input unit 707 includes a touch panel 7071 and another input device 7072. The touch panel 7071 is also referred to as a touch screen. The touch panel 7071 may include two parts: a touch detection apparatus and a touch controller. The another input device 7072 may include, but is not limited to, a physical keyboard, a functional key (such as a volume control key or a switch key), a track ball, a mouse, and a joystick, and details are not described herein again.

In this embodiment of this application, the radio frequency unit 701 receives downlink data from a network-side device and transmits the downlink data to the processor 710 for processing, and transmits uplink data to the network-side device. Generally, the radio frequency unit 701 includes, but is not limited to, an antenna, at least one amplifier, a transceiver, a coupler, a low noise amplifier, a duplexer, and the like.

The memory 709 may be configured to store a software program or instruction and various data. The memory 709 may mainly include a program or instruction storage region and a data storage region. The program or instruction storage region may store an operating system, an application program or instruction required by at least one function (for example, a sound playback function and an image playback function), or the like. In addition, the memory 709 may include a high-speed random access memory, or may include a non-volatile memory, where the non-volatile memory may be a Read-Only Memory (ROM), a Programmable ROM (PROM), an Erasable PROM (EPROM), an Electrically EPROM (EEPROM), or a flash memory. For example, the non-volatile memory may be at least one magnetic disk storage device, a flash memory device, or other volatile solid-state storage devices.

The processor 710 may include one or more processing units; and for example, the processor 710 may integrate an application processor and a modern processor. The application processor mainly processes an operating system, a user interface, and an application program or instruction. The modem processor mainly processes wireless communication, such as a baseband processor. It may be understood that the modem processor may not be integrated into the processor 710.

The processor 710 is configured to configure, by a terminal, a first discontinuous reception DRX parameter based on QoS Profile information; and the processor 710 is configured to configure, by the terminal, a second DRX parameter based on Destination L2 ID information, where the QoS Profile information includes a plurality of QoS IDs, the terminal includes a plurality of Destination L2 IDs, the first DRX parameter includes at least an sl-drx-onDurationTimer parameter and an sl-drx-Cycle parameter, and the second DRX parameter includes at least an sl-drx-StartOffset parameter.

In some embodiments, the processor 710 is configured to:

group, by the terminal, the plurality of QoS IDs based on a PDB corresponding to each QoS ID, to obtain a plurality of QoS ID subgroups; and

configure, by the terminal, a different first DRX parameter for each QoS ID subgroup based on a minimum value of the PDB corresponding to each QoS ID subgroup, where each Destination L2 ID corresponds to at least one QoS ID subgroup.

In some embodiments, the processor 710 is configured to:

group, by the terminal, the plurality of Destination L2 IDs to obtain a plurality of Destination L2 ID sets: and configure, by the terminal, a different second DRX parameter for each Destination L2 ID set.

In some embodiments, the sl-drx-Cycle parameters in different QoS ID subgroups have an integer multiple relationship.

The relationship between drx-Cycles herein may be a relationship between values of the drx-Cycle parameters, or a relationship between lengths of the drx-Cycle parameters.

In some embodiments, the processor 710 is configured to:

determine, by the terminal, an active duration and an inactive duration of the first DRX parameter and the second DRX parameter based on a direct frame number DFN.

In some embodiments, the DFN is any of the following.

a DFN of the terminal;

a DFN of a peer terminal of the terminal: and a DFN determined based on a PC5 RRC interaction process.

In some embodiments, the first DRX parameters corresponding to different QoS ID subgroups are different, and the second DRX parameters corresponding to different QoS II) subgroups are the same. An embodiment of this application further provides a readable storage medium, storing a program or instruction, where the program or instruction, when executed by a processor, implements all processes of the foregoing configuration method embodiment, and can achieve the same technical effects. To avoid repetition, details are not described herein again.

The processor is the processor in the terminal in the foregoing embodiments. The readable storage medium includes a computer-readable storage medium, for example, a ROM, a Random Access Memory (RAM), a magnetic disk, or an optical disc.

An embodiment of this application further provides a chip, including: a processor and a communication interface, where the communication interface is coupled to the processor, and the processor is configured to run a program or instruction, to implement all processes of the foregoing configuration method embodiment, and can achieve the same technical effects. To avoid repetition, details are not described herein again.

It should be understood that, the chip mentioned in this embodiment of this application may also be referred to as a system-level chip, a system chip, a chip system, or a system on chip.

An embodiment of this application further provides a computer program product, where the computer program product is stored in a non-volatile storage medium, and the computer program product is executed by at least one processor to implement the foregoing configuration method.

It should be noted that the terms "include", "comprise", or any other variation thereof in this specification is intended to cover a non-exclusive inclusion, which specifies the presence of stated processes, methods, objects, or apparatuses, but do not preclude the presence or addition of one or more other processes, methods, objects, or apparatuses. Without more limitations, elements defined by the sentence "including one" does not exclude that there are still other same elements in the processes, methods, objects, or apparatuses. In addition, it should be pointed out that the scope of the methods and apparatuses in the embodiments of this application is not limited to performing the functions in the order shown or discussed, but also can include performing the functions in basically the same way or in the opposite order according to the functions involved, for example, the described methods can be performed in a different order from the described ones, and various steps can also be added, omitted, or combined. In addition, features described with reference to some examples may be combined in other examples.

Through the descriptions of the foregoing implementations, a person skilled in the art may clearly understand that the method according to the foregoing embodiments may be implemented by means of software and a necessary general hardware platform, or may be implemented by hardware. In some embodiments, the technical solutions in this application entirely or the part contributing to the reflected technologies may be implemented in the form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing embodiments, which are merely illustrative rather than limited. Under the inspiration of this application, a person of ordinary skill in the art may make various variations without departing from the scope of this application and the protection of the claims, and such variations shall fall within the protection of this application.

What is claimed is:

1. A configuration method, comprising:

grouping, by a terminal, a plurality of Quality of Service (QOS) IDs to obtain a plurality of QoS ID subgroups;

configuring, by the terminal, a first Discontinuous Reception (DRX) parameter for each QOS ID subgroup;

grouping, by the terminal, a plurality of Destination Layer 2 (L2) IDs to obtain a plurality of Destination L2 ID sets; and configuring, by the terminal, a second DRX parameter for each Destination L2 ID set, wherein:

each Destination L2 ID corresponds to at least one QoS ID subgroup, the first DRX parameter comprises at least a sidelink discontinuous reception on-Duration Timer (sl-drx-onDurationTimer) parameter or a sidelink discontinuous reception Cycle (sl-drx-Cycle) parameter, and the second DRX parameter comprises at least a sidelink discontinuous reception Start Offset (sl-drx-StartOffset) parameter.

2. The configuration method according to claim 1, wherein grouping, by the terminal, the plurality of QOS IDs to obtain the plurality of QoS ID subgroups is performed based on a Packet Delay Budget (PDB) corresponding to each QOS ID, and configuring, by the terminal, the first DRX parameter for each QoS ID subgroup is performed based on a minimum value of the PDB corresponding to each QoS ID subgroup.

3. The configuration method according to claim 1, wherein the second DRX parameter for each parameters for different Destination L2 ID sets are different.

4. The configuration method according to claim 2, wherein the sl-drx-Cycle parameters in different QOS ID subgroups have an integer multiple relationship.

5. The configuration method according to claim 1, wherein the method further comprises:

determining, by the terminal, an active duration and an inactive duration of the first DRX parameter and the second DRX parameter based on a Direct Frame Number (DFN).

6. The configuration method according to claim 5, wherein the DFN is any one of the following:

a DFN of the terminal, a DFN of a peer terminal of the terminal, or a DFN determined based on a PC5 RRC interaction process.

7. The configuration method according to claim 2, wherein the first DRX parameters corresponding to different QOS ID subgroups are different, and the second DRX parameters corresponding to different QoS ID subgroups are the same.

8. A terminal, comprising a processor; a memory having a computer program or an instruction stored thereon, wherein the computer program or the instruction, when executed by the processor, causes the processor to implement operations, comprising:

grouping, a plurality of Quality of Service (Qos) IDs to obtain a plurality of QoS ID subgroups;

configuring a first Discontinuous Reception (DRX) parameter for each QoS ID subgroup;

grouping, a plurality of Destination Layer 2 (L2) IDs to obtain a plurality of Destination L2 ID sets; and configuring a second DRX parameter for each Destination L2 ID set, wherein:

each Destination L2 ID corresponds to at least one QoS ID subgroup, the first DRX parameter comprises at least a sidelink discontinuous reception on-Duration Timer (sl-drx-onDurationTimer) parameter or a sidelink discontinuous reception Cycle (sl-drx-Cycle) parameter, and the second DRX parameter comprises at least a sidelink discontinuous reception Start Offset (sl-drx-StartOff-set) parameter.

9. The terminal according to claim 8, wherein grouping the plurality of QOS IDs to obtain the plurality of QoS ID subgroups is performed based on a Packet Delay Budget (PDB) corresponding to each QoS ID, and configuring the first DRX parameter for each QOS ID subgroup is performed based on a minimum value of the PDB corresponding to each QOS ID subgroup.

10. The terminal according to claim 8, wherein the second DRX parameters for different Destination L2 ID sets are different.

11. The terminal according to claim 9, wherein the sl-drx-Cycle parameters in different QoS ID subgroups have an integer multiple relationship.

12. The terminal according to claim 8, wherein the operations further comprise:

determining an active duration and an inactive duration of the first DRX parameter and the second DRX parameter based on a Direct Frame Number (DFN).

13. The terminal according to claim 12, wherein the DFN is any one of the following:

a DFN of the terminal, a DFN of a peer terminal of the terminal, or a DFN determined based on a PC5 RRC interaction process.

14. The terminal according to claim 9, wherein the first DRX parameters corresponding to different QoS ID subgroups are different, and the second DRX parameters corresponding to different QoS ID subgroups are the same.

15. A non-transitory computer readable storage medium, storing a computer program or an instruction that, when executed by a processor, causes the processor to implement operations, comprising:

grouping, a plurality of Quality of Service (QOS) IDs to obtain a plurality of QoS ID subgroups;

configuring a first Discontinuous Reception (DRX) parameter for each QoS ID subgroup;

grouping, a plurality of Destination Layer 2 (L2) IDs to obtain a plurality of Destination L2 ID sets; and configuring a second DRX parameter for each Destination L2 ID set, wherein:

each Destination L2 ID corresponds to at least one QoS ID subgroup, the first DRX parameter comprises at least a sidelink discontinuous reception on-Duration Timer (sl-drx-onDurationTimer) parameter or a sidelink discontinuous reception Cycle (sl-drx-Cycle) parameter, and the second DRX parameter comprises at least a sidelink discontinuous reception Start Offset (sl-drx-StartOff-set) parameter.

16. The non-transitory computer readable storage medium according to claim 15, wherein grouping the plurality of QOS IDs to obtain the plurality of QOS ID subgroups is performed based on a Packet Delay Budget (PDB) corresponding to each QoS ID, and configuring the first DRX parameter for each QoS ID subgroup is performed based on a minimum value of the PDB corresponding to each QoS ID subgroup.

17. The non-transitory computer readable storage medium according to claim 15, wherein the second DRX parameters for different Destination L2 ID sets are different.

18. The non-transitory computer readable storage medium according to claim 16, wherein the sl-drx-Cycle parameters in different QoS ID subgroups have an integer multiple relationship.

19. The non-transitory computer readable storage medium according to claim 15, wherein the operations further comprise:

determining an active duration and an inactive duration of the first DRX parameter and the second DRX parameter based on a Direct Frame Number (DFN).

20. The non-transitory computer readable storage medium according to claim 19, wherein the DFN is any one of the following:

a DFN of the terminal, a DFN of a peer terminal of the terminal, or a DFN determined based on a PC5 RRC interaction process.

* * * * *